THOMAS & MAST.
Grain Drill.
No. 21,034.
Patented July 27, 1858
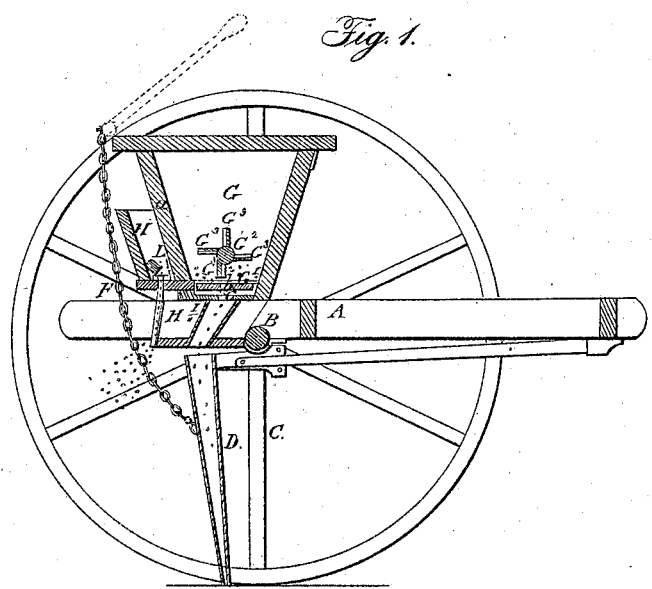
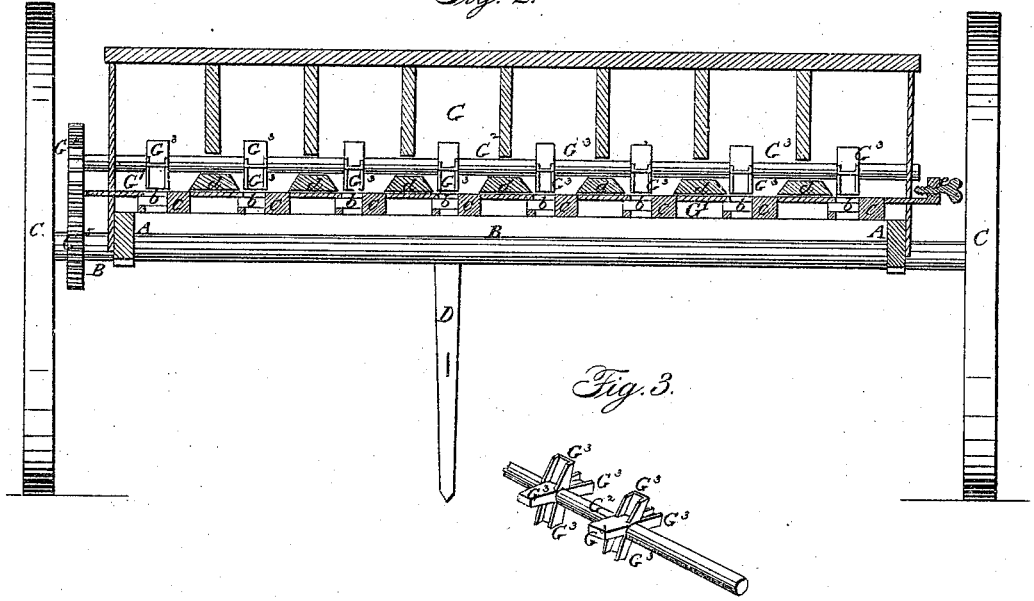

UNITED STATES PATENT OFFICE.

J. H. THOMAS AND P. P. MAST, OF SPRINGFIELD, OHIO.

IMPROVEMENT IN SEED-PLANTERS.

Specification forming part of Letters Patent No. 21,034, dated July 27, 1858.

*To all whom it may concern:*

Be it known that we, J. H. THOMAS and P. P. MAST, of Springfield, in the county of Clarke and State of Ohio, have invented a new and useful Improvement in Seed-Planters; and we do hereby declare that the following is a full, clear, and exact description of the same, reference being had to the accompanying drawings, forming a part of this specification, in which—

Figure 1 is a vertical longitudinal section of a seed-planter constructed with our improvements. Fig. 2 is a vertical transverse section of the same. Fig. 3 is a perspective view of a portion of the shaft which insures the deposit of the seed into the cells of the distributing-slide.

Similar letters of reference in each of the figures indicate corresponding parts.

The nature of our invention consists, first, in the use of flaring inclined gutter-shaped arms on the shaft, which is arranged in the hopper and lifts and agitates the grain, in combination with the peculiar construction of distributing-slide herein described, this arrangement insuring a more perfect taking up or lifting of the grain and its certain deposit, in equal quantities, into the cells of the distributing-slide and perfect discharge therefrom into the drill-tubes; second, in the employment of a wheat-hopper, which has its back board set at a greater inclination than usual, in combination with a grass-seed hopper and the flaring seed-conductors, when said grass-seed hopper and flaring conductors or spreaders are arranged behind the wheat-hopper and so located that the back board of the wheat-hopper shall completely overhang the same. By this arrangement of grass-seed hopper grass-seed can be planted at the same time that the wheat is planted in the rear of the drill-tubes, instead of, as usual, in front of the same, from a hopper arranged in front of the wheat-hopper, and thus the disadvantage of having the grass-seed planted in the deep furrows with the wheat is entirely overcome, and said seed can be planted on the surface, as it should be in order to have it spring up as speedily as desired.

One serious objection to arranging the grass-seed hopper in the rear of the wheat-hopper has been that of its being in the way of the bar and chains by which the drill-teeth are elevated. With our arrangement this objection is overcome by giving a greater inclination to the back of the main hopper than usual, and so locating the grass-seed box that the back of the wheat-box completely overhangs it.

To enable others skilled in the art to make and use our invention, we will proceed to describe its construction and operation.

A represents the frame of the seed-drill; B, the axle; C C, the propelling-wheels; D D, the drill-tubes, and F F the mechanism by which they are elevated.

G is the wheat-hopper. Its back board, $a$, is inclined to a greater extent than usual.

G' is the wheat-distributing slide. It has elongated passages or cells $b\ b$ for measuring the wheat. The passages of this slide are partially plugged by stops or blocks $c\ c$, which are stationary and serve, in connection with the partitions $d\ d$, when the slide is adjusted laterally to the left by the set-screw $e$, for decreasing the capacity of the cells $b\ b$, and for increasing the capacity of the same when the slide is adjusted to the right by said screw.

$G^2$ is a shaft, carrying gutter-shaped arms $G^3$, which lift and deposit the grain into the cells $b\ b$ of the slide. This shaft is revolved in the hopper by means of spur-wheels $G^4\ G^5$, as will be evident from the drawings. It will be seen that the gutters in the arm are inclined and flaring. This form is given them in order that while they are capable of lifting the grain and holding it until the proper time for discharge arrives they shall very readily discharge it when they arrive directly over the cells of the slide.

H is the grass-seed hopper, arranged behind the main hopper, so as to be completely hid from view, when looking down upon the top of the machine, by the inclined back board of the wheat-hopper. The grass-seed hopper is furnished with a square rod, I, which serves for agitating the small seed, facilitating and insuring its regular discharge, said rod being revolved in the hopper by means of a pinion, which gears into the spur-wheel $G^4$.

H' H' are flaring conductors or spreaders for the fine seed.

By examining the drawings the manner in which the grass-seed hopper is hid from view and located so as not to interfere with the chains and lifting-rod of the drill-teeth will be readily seen.

What we claim as our invention, and desire to secure by Letters Patent, is—

1. The use of flaring inclined gutter shaped arms $G^3$ $G^3$ on the shaft, which is arranged in the hopper G and lifts and agitates the grain, in combination with the peculiar construction of distributing-slide herein described, substantially as and for the purposes set forth.

2. The employment of the above wheat hopper G and its attachments, as described and shown, in combination with a grass-seed hopper, H, and the flaring seed-conductors H', when said grass-seed hopper and flaring conductors or spreaders H' are arranged behind the wheat-hopper G, and so located that the back board, $a$, of the wheat-hopper shall completely overhang the same, substantially as and for the purposes set forth.

The above specification of our improvement in seed-planters signed by us this 17th day of June, 1858.

J. H. THOMAS.
P. P. MAST.

Witnesses:
E. COPLAND,
GEO. SPENCE.